(12) United States Patent
Gross et al.

(10) Patent No.: US 7,445,554 B2
(45) Date of Patent: Nov. 4, 2008

(54) INSULATION FOR A UNIVERSAL CROSS JOINT

(75) Inventors: Norbert Gross, Duesseldorf (DE); Thomas Schmitz Dr, Essen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 11/276,051

(22) Filed: Feb. 10, 2006

(65) Prior Publication Data

US 2006/0183555 A1 Aug. 17, 2006

(30) Foreign Application Priority Data

Feb. 11, 2005 (EP) .................... 05100994

(51) Int. Cl.
*F16D 3/28* (2006.01)
(52) U.S. Cl. ......................... 464/70; 464/132
(58) Field of Classification Search .................. 464/70, 464/132, 136; 384/536, 582
See application file for complete search history.

(56) References Cited

U.S. PATENT DOCUMENTS

| | | | | |
|---|---|---|---|---|
| 1,456,068 A | * | 5/1923 | Lord | ........................ 464/70 |
| 2,062,290 A | * | 12/1936 | Bott | ........................ 384/536 |
| 4,412,827 A | * | 11/1983 | Petrzelka et al. | ........ 464/132 X |
| 4,850,933 A | | 7/1989 | Osborn | |
| 5,309,529 A | * | 5/1994 | Gruber | ........................ 384/536 |
| 6,685,569 B2 | * | 2/2004 | Kurzeja et al. | ................ 464/70 |
| 6,923,726 B1 | * | 8/2005 | Lindenthal et al. | .......... 464/132 |
| 2002/0016208 A1 | * | 2/2002 | Brissette et al. | ............. 464/136 |

FOREIGN PATENT DOCUMENTS

| | | | |
|---|---|---|---|
| EP | 0160599 | 7/1988 | |
| EP | 0563940 A2 | 6/1993 | |
| FR | 2568329 A1 | 1/1986 | |
| GB | 942495 | 9/1963 | |
| SU | 606021 | * 5/1978 | .................. 464/70 |
| SU | 606021 A1 | * 5/1978 | |

* cited by examiner

*Primary Examiner*—Greg Binda
(74) *Attorney, Agent, or Firm*—O'Brien Jones, PLLC

(57) ABSTRACT

A universal joint comprises first and second joint yokes having axially opposite yoke arms with bearing bores configured to receive bearings having pin bores, a cross member comprising orthogonally-arranged pin bearers having pins configured to be inserted into the pin bores, and at least one insulation element configured to be inserted between the pins and respective pin bores or the bearings and respective bearing bores, the at least one insulation element having an elliptical cross section that forms crescent-shaped recesses between its inner wall and the pin or bearing that resides therein.

6 Claims, 2 Drawing Sheets

INSULATION FOR A UNIVERSAL CROSS JOINT

The present invention is related to: U.S. patent applications Ser. No. 11/276,047 entitled "Axial Insulation for a Universal Joint", U.S. patent application Ser. No. 11/276,049 entitled "Axial Insulation for a Universal Cross Joint", U.S. patent application Ser. No. 11/276,052 entitled "Universal Cross Joint with Axial Insulation", and U.S. patent application Ser. No. 11/276,053 entitled "A Cardanic Cross Joint With Insulation", filed simultaneously herewith.

FIELD OF THE INVENTION

The invention relates to a universal joint having two joint yokes and a cross member, wherein one of the joint yokes is connectable or connected with a driven shaft or a drive shaft, and the other joint yoke is connectable or connected to a shaft to be driven or a drive shaft, and wherein the two joint yokes are arranged twisted radially at an angle of 90° in relation to each other so that the two joint yokes form an internal space in which the cross member is disposed.

BACKGROUND OF THE INVENTION

Universal joints are usually used when two torque-transmitting shafts whose aligned orientation is not always ensured are to be connected with each other. The universal joint then usually consists of two opposing joint yokes that are arranged twisted radially at an angle of 90° in relation to each other that each represents one end of the two shafts that are to be connected in an articulated manner. The cross member, which consists of two pin bearers offset against each other by 90°, is disposed between the joint yokes, the cross member being made of one piece so that the two pin bearers are rigidly connected with each other. The pin bearers are each supported, pivotally about their axes, in the two joint yokes.

With regard to the transmission of driving forces, the skilled person is regularly presented with the task of transmitting the rotational movement on the one hand, but, on the other, of eliminating vibrations and shocks if possible. Such interferences may, for example, be caused by vibrations from the drive unit. This problem is especially noticeable in automobile engineering, in particular in the area of the drive train, for example in the area of the universal shaft where the vibrations between drive assembly and rear axle are transmitted without hindrance, and in the area of the steering line or in the steering column where, should conventional universal joints be used, no insulation whatsoever is effected against low-frequency vibrations or shocks imposed by road bumps. Such interferences may, on the one hand, lead to damages in the drive train or the steering column and/or to adverse effects of an acoustic or mechanical nature for the driver.

For the purpose of uncoupling with regard to acoustics or vibration dynamics, in particular in the steering column, it is, for example, known to use a torsional elastic coupling with a so-called Hardy disk as an axially elastic coupling element or a loop disk. The Hardy disk is disposed, for example, in the steering column between the bottom universal joint and a steering housing or steering gear or between the universal joints. The Hardy disk, which is rigid in the direction of rotation, is formed such that it is soft in the direction of the steering column. As principle requires, the bending stiffness of the Hardy disk is relatively small. This causes a distortion of the Hardy disk with the bending moments from the universal joint if the Hardy disk is arranged in series with the universal joint, as is commonly the case. Since a Hardy disk alone (without a universal joint), at least given appropriate life expectancies, is not suitable for connecting non-aligned shafts, the number of components is disadvantageously increased with the necessary arrangement in series with the universal joint. Furthermore, the axial constructional space is increased thereby, and the usual compensation of the discontinuities by means of two universal joints arranged in anti-phase is disturbed by the additional Hardy disk since it works like an additional joint when placed in series.

The following is a discussion of relevant art pertaining to Universal joints. The discussion is provided only for understanding of the invention that follows. The summary is not an admission that any of the work described below is prior art to the claimed invention.

EP 0 563 940 B1 discloses a universal joint comprising two forks which are situated opposite one another with a 90° offset and which are each a part of each one of two shafts which are to be pivotally interconnected, or which are adapted each to be connected to each one of two shaft ends which are to be pivotally interconnected, and comprising two journal pairs which are offset by 90° from another and which form a journal cross and which are rotatable about their axis in the respective fork ends and, relative to the rotational axis of the shafts, are mounted for torque transmission, the two journal pairs being at least slightly pivotable relatively to one another in the plane formed by the journal cross, each journal being mounted in an anchor bracket and adjacent anchor brackets are interconnected by an elastic coupling element, whereby the elastic coupling element contains reinforcing inlays in loop form, which are disposed to be stationary and which each interconnect two adjacent anchor brackets and in that the reinforcing inlays in loop form are situated along the periphery of the universal joint in a loop plane which is perpendicular to the plane of the journal cross.

It must be regarded as a main disadvantage of the cross joint disclosed in EP 0 563 940 B1 that the two pairs of pins connect the own pins with each other integrally in different ways: The one pair uses a through bolt, the other pair is configured from two short pins that are connected with each other by means of an additional connecting portion. For this reason, a different production tool is required for the production of each pin or pair of pins, which makes the production of the cross joint extremely cost-intensive. The necessary connecting portion furthermore limits the axial and radial clearance of the joint. Furthermore, the need for axial constructional space can be optimized.

It is a further disadvantage that the cross joint disclosed in EP 0 563 940 B1 takes a lot of constructional effort and is thus very susceptible to malfunction. It must be considered a further disadvantage that the yokes must be designed small with regard to width and that thus, their yoke bearings must be designed to be bigger (more expensive) in order to transmit a sufficient torque given reasonable construction dimensions. If the flexible ring is damaged in the cross joint of EP 0 563 940 B1, a replacement ring must be supplied via the anchors. In addition, the cross joint is difficult to balance, especially in the case of shafts that rotate quickly.

EP 0 160 599 describes a flexible coupling device comprising first and second yokes which are intended to be fixed, respectively, to a drive member and a driven member, which each have arms arranged so that the arms of the first yoke are interposed with those of the second yoke, whereby to each yoke is fixed a support and these two supports are arranged opposite each other so that the facing surfaces of these supports are substantially perpendicular to the rotation axis of the device, in that an elastomeric linking element is fixed to these facing surfaces of the supports, and in that each support is fixed to the corresponding yoke by means of a spindle engaging in at least one opening in said support and in holes provided in the arms of said yoke.

GB 942,495 discloses a universal coupling for shafts comprising a flexible disc having coupling elements extending one on each side thereof, each for connection to one of the shafts to be coupled, the coupling elements being pivoted to the disc about axes at right angles and lying normally to the axis of the disc whereby, in use of the coupling, angular misalignment of the coupled shafts may be accommodated by pivoting of the coupling elements without flexure of the disc, the disc being composed wholly or mainly of plastic, rubber or the like resilient material which is unrestrained so as to be free to flex during use of the coupling.

It must be considered as a main disadvantage of the connection for shafts disclosed in GB 942,495 that the coupling elements are rotated with clearance towards the disk and with significant friction, the torsion clearance and the friction merely satisfying modest demands.

A universal joint is disclosed in FR 2 568 329. In the universal joint, a damping element is disposed. A cross pin is separated into two pin bearers that are centrally connected via an elastic bush. In this case, it is disadvantageous that the centrally disposed bush can only supply a relatively high rotational compliance (with small rotational stiffness) since the pair of forces resulting from the input torque only has a relatively small distance of effect.

Therefore, there is a need for an improved a universal joint of the type mentioned at the beginning with simple means in such a way that it is cheaper to produce from an economic standpoint, while an effective uncoupling, with regard to acoustics and, or vibration dynamics, of the shafts to be connected is achieved.

SUMMARY OF THE INVENTION

This invention provides a universal joint for coupling a drive shaft and a driven shaft comprising two joint yokes. Each yoke has a pair of radially opposing bearing elements at each of its axially opposite yoke arms. One joint yoke is connected with the driven shaft and the other joint yoke is connected to the drive shaft. The two joint yokes are arranged radially at an angle of 90° in relation to each other to form an internal space. The universal joint also includes a cross member disposed in the internal space having two pin bearers arranged orthogonally in relation to each other. Each pin bearer is pivoted in the respectively associated joint yokes. The invention further includes at least one insulating element associated with one of the pair of radially opposing bearing elements at each of the axially opposite yoke arms. The at least one pair of radially opposing bearing elements has a pair of insulation elements.

With the arrangement of at least one pair of insulation elements according to the invention, a shock and vibration absorption in the universal joint is achieved in the simplest manner. In order to attain a twofold insulation, it may be expediently provided that one pair of insulation elements, respectively, is associated with both pairs of bearings. This means that one insulation element, respectively, may be associated with each of the four bearings.

It is useful within the sense of the invention if the bearings are designed as single-row bearings. The bearings may, for example, be designed as anti-friction bearing, e.g., as ball bearing, the bearings may of course also be designed as plain bearings. Preferably, at least one bearing per joint yoke is capable of accepting axial bearing forces in addition to the radial bearing forces. The bearings can be fixed in a suitable manner in the joint yokes or their yoke arms. Possible embodiments are, for example, press fit, bonding or positive fit (abutting of the shoulder, spring ring or the like) of the outer races of the bearings in the associated yoke arms or, for example, by means of positive fit of the bearings, e.g. by means of one-sided and/or two-sided shoulder fit on the pin bearer.

It is convenient within the sense of the invention if the pin bearers have a shoulder in the transition to their pins that are disposed on the end side, respectively, which shoulder abuts a side of the bearings oriented towards the internal space. However, it is also possible that the insulating element with its front abuts the shoulder.

In a preferred embodiment of the invention it is provided that the pins, in radial direction, each protrude a little over an outer side opposite to the internal space and can be secured by means of a securing element. The securing element can be designed as a shaft securing ring and be taken up in a groove that is placed at a suitable location on the pin. Of course, the pin can also be flush with the outer side or end a little underneath the outer side.

For the absorption of vibrations and/or axial shocks it is expediently provided that the insulation element or the insulation elements consist(s) of an elastic material, for example, rubber. In a preferred embodiment, the insulation element or the insulation elements are designed as a bush. The insulating element or elements are preferably designed as shock and vibration absorbers having anisotropic properties. Properties, in which the insulation element or elements have different absorption properties, in particular different stiffness, in two radial bearing axes that are perpendicular to each other, are considered to be anisotropic properties within the sense of the invention.

In order to obtain the anisotropic properties, it is favorable within the sense of the invention if the insulation element or elements have, in their wall, recesses in the material or recesses. In a preferred embodiment, the recesses in the material or recesses are designed partially elliptic or crescent-shaped, seen in a side view. Of course, the recesses can have other geometric designs, seen in a side view. On the one hand, anisotropy with regard to the vibration absorbing property can be produced particularly simply in this manner since the cavity formed by the recess inter alia changes the elastic properties of the insulating element or elements. On the other hand, an appropriate protrusion on the pin bearers or joint yokes may be formed in one embodiment in order to dispose different amounts of elastic material in the various radial bearing axles and thus to adjust different stiffness in the different radial directions. Of course, the insulation element or elements may also be manufactured from an inhomogeneous material in order to achieve the anisotropic properties.

Thus, the rotational compliance of the joint may be minimal in one embodiment of the insulating element or elements. A large rotational compliance, for example, in a motor vehicle steering column, causes a "spongy" steering behavior that can be avoided with the large rotational stiffness that can be realized in the universal joint according to the invention.

At the same time, a large axial compliance of the joint at a large rotational stiffness can be achieved, which, for example, can be utilized in a motor vehicle steering column for the advantageous filtering of stimuli from the road. The minimization of the axial stiffness of the universal joint at a large rotational stiffness is realized in an optimal manner by the maximized distance of the insulation elements, namely at the bearing positions in the respective joint yoke.

Absorption of shock or vibration in the sense of the invention is to be assessed by means of the other materials or components used in the universal joint. When excitation with vibrations of structure-borne noise occurs, absorption occurs, for example, in certain frequency ranges, in particular the low-frequency range, as compared to the other materials of the universal joint, or rather a response of the material to a shock excitation shows a weakened impulse.

In a preferred embodiment of the invention, it is provided that the respective insulation element is disposed between the bearing and the associated joint yoke or the corresponding yoke arm, the bearing with its inner bearing shell abutting the circumference of the pin and with its outer bearing shell abutting an inner circumference of the insulation element or the bush.

In a further preferred embodiment, it is provided in an expedient manner that the respective insulation element is disposed between the bearing and the pin, the bearing with its inner bearing shell abutting an outer circumference of the insulation element and with its outer bearing shell abutting an inner circumference of a receiving opening in the corresponding yoke arms.

Surprisingly, it became apparent due to the arrangement according to the invention of the insulation element or elements, on the one hand, between the bearing and the yoke arm and, on the other hand, between the bearing and the pin, that a particularly effective uncoupling, with regard to acoustics and vibration dynamics, of the shafts connected to each other is achieved. Further, the insulation elements are subjected to a comparatively small, in particular only one-sided, mechanical strain. For example, the torsional forces on the insulation elements are canceled so that the life expectancy of the bearing is significantly increased. Furthermore, a particularly simple construction is thus achieved and the insulation elements can easily be replaced in case of breakdown. With such an arrangement, it is furthermore achieved that even in case of a failure of the insulation element a transmission of the drive forces is still possible since, for example in the case of a two-sided bearing of the joint yoke at the joint cross, an additional intact connection is maintained on the one hand, and on the other hand, an engagement of the bearing is maintained on the damaged side. In this way, a transmission of forces is ensured even in case of damage, which is advantageous in particular when the universal joint according to the invention is used in the steering line of motor vehicles. Furthermore, the universal joint becomes comparatively compact in spite of the measures for acoustically and vibration-dynamically uncoupling the shafts that are connected with each other. Additional measures for uncoupling the shafts with regard to acoustics and vibration dynamics are not necessary, and the disadvantages connected therewith, such as increased constructional effort and required space and increased moved mass are avoided.

The invention can further include one or more features being subject matter of the dependant claims. Modes for carrying out the present invention are explained below by reference to non limiting embodiments of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

Further advantageous embodiments of the invention are disclosed in the dependent claims and the following description of the figures. In the figures:

In the different figures, the same parts are always provided with the same reference numeral so that they are also only described once, as a rule.

DETAILED DESCRIPTION OF THE INVENTION

Figure 2:
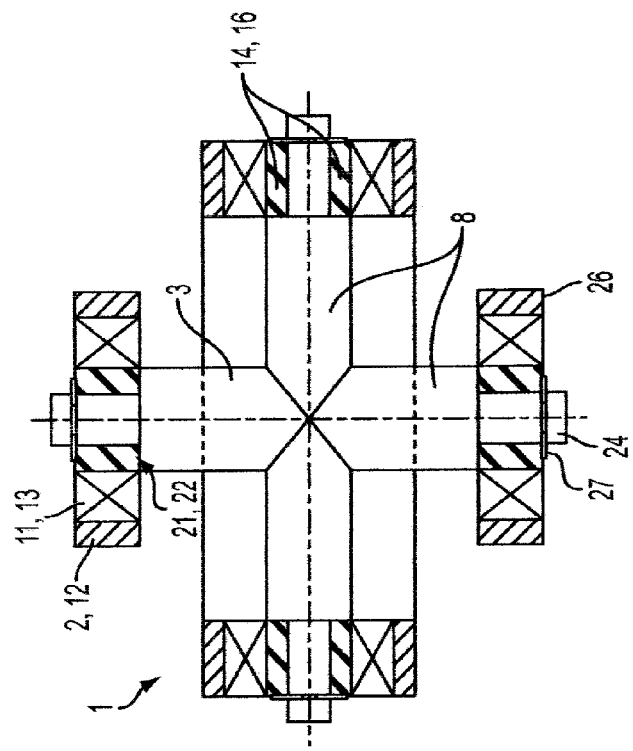
FIG. 2 shows a representation along a section A-A from FIG. 1.

FIGS. 1 to 4 show a universal joint 1 having two joint yokes 2 and a cross member 3. One of the joint yokes 2 is connected to a driven shaft 4 or drive shaft 4, the other joint yoke 2 being connected to the shaft to be driven 6 or drive shaft 6. The two joint yokes 2 are arranged twisted radially at an angle of 90° in relation to each other so that the two joint yokes 2 form an internal space 7. The cross member 3 is disposed in the internal space 7. The cross member 3 comprises two pin bearers 8 arranged orthogonally in relation to each other. The pin bearers 8 are pivoted in the respectively associated joint yokes 2. The pin bearers 8 crossing each other are rigidly connected with each other. The pin bearers 8 are pivoted, with their pins 9 that are arranged, respectively, at the end sides, in the associated joint yoke 2 or in their yoke arms 12 via bearings 11. The radially opposing bearings 11 of the respective joint yoke 2 each form a pair 13 of bearings. At least one insulation element 14, respectively, is associated with at least one of the pairs 13 of bearings or with the respective bearing 11 of the at least one pair 13 of bearings, so that the at least one pair 13 of bearings has a pair 16 of insulation elements.

In the embodiment shown in the FIGS. 1 to 4, one insulation element 14 or pair 16 of insulation elements, respectively, is associated with all four bearings 11 or both pairs 13 of bearings. However, it is also possible to associate one pair 16 of insulation elements with only one pair 13 of bearings.

Figure 1:
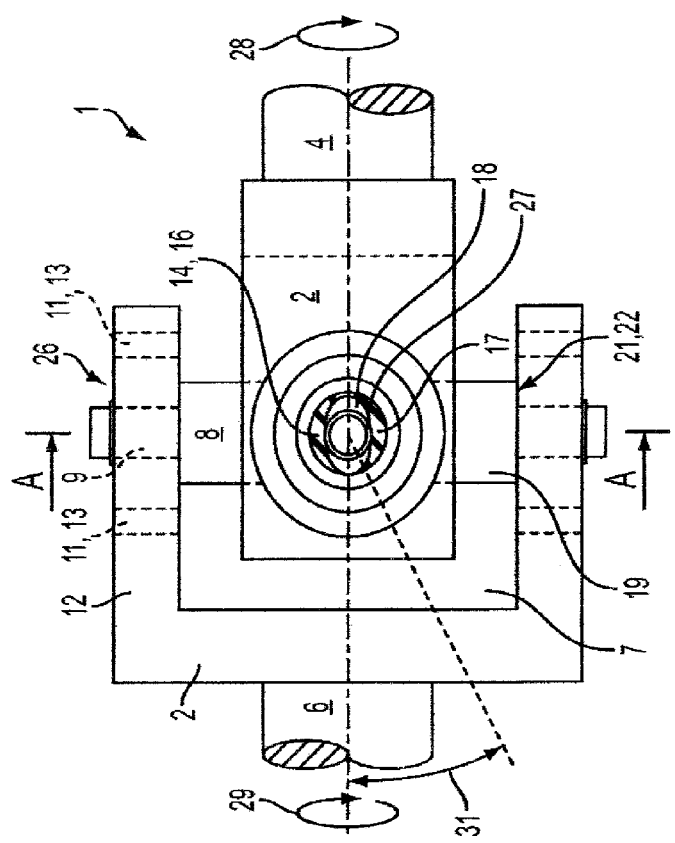
FIG. 1 shows a side view of a universal joint.
Figure 3:
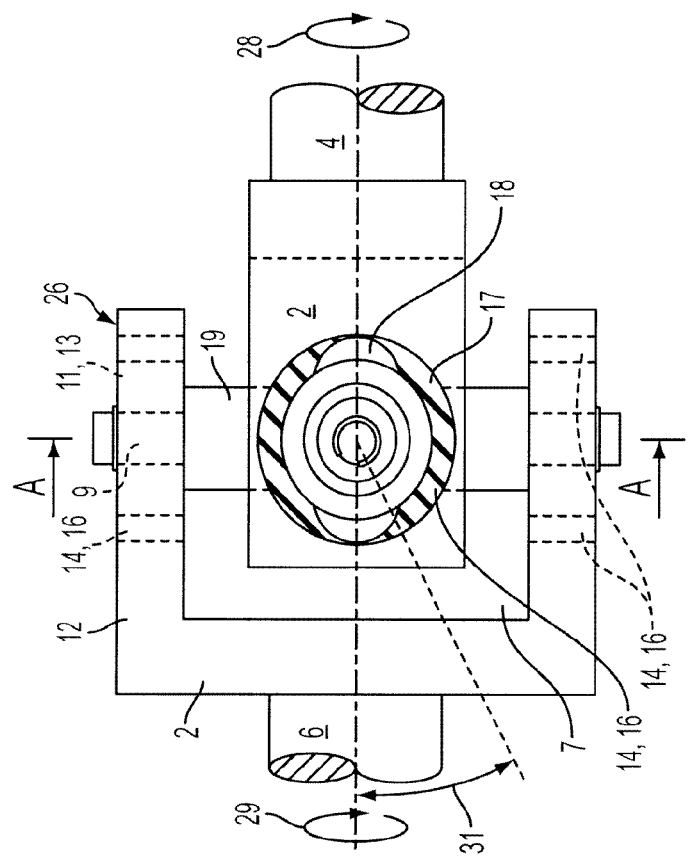
FIG. 3 shows a side view of a universal joint in a second embodiment.

The insulation element 14, respectively, is designed as a bush and has on its wall 17 recesses in the material or recesses 18 (FIGS. 1 and 3). Thus it is achieved that the insulation element 14 or the corresponding pair 16 of insulation elements has anisotropic properties regarding different absorptive properties, in particular regarding different stiffness in axial and radial direction, and that it thus can be adjusted to different requirements. The recesses in the material or recesses 18, seen in a side view, are essentially designed partially elliptic or crescent-shaped. The recesses in the material or recesses 18, seen in a side view, can however also have other geometric designs in order to be adjustable to individual requirements of the universal joint 1. The insulation element or elements 14 thus can also be called shock or vibration absorbers, for example for uncoupling, with regard to acoustics and/or vibration dynamics, the two shafts 4 or 6 connected with each other.

The respective pin bearer 8 has a base body 19 to which the pin 9 is connected. The pin 9 is somewhat narrower than the base body 19, so that a shoulder 22 is formed in a transition 21 from the base body 19 to the pin 9.

In the exemplary embodiment shown in FIGS. 1 and 2, the respective insulation element 14 is disposed in a receiving opening between the respective bearing 11 and the associated pin 9 With its inner bearing shell, the bearing 11 envelops an outer circumference of the insulation element 14, an inner circumference of the insulation element 14 enveloping the pin 9. The bearing 11 abuts the shoulder 22 with its front that points toward the internal space 7.

The pin 9 reaches through the bearing 11 and with its free end 24 protrudes slightly over an outer side 26, which is opposite to the internal space 7, of the joint yoke 2 or its yoke arm 12. A securing element 27, for example a shaft securing ring, which abuts the side of the bearing 11 pointing towards the outer side 26, is associated with the free end 24. A corresponding groove can be provided at a suitable location in the pin 9 for receiving the securing element 27. Of course, the pin 9 may also end within the bearing 11 with its free end, or end flush with the outer side 26.

Figure 4:
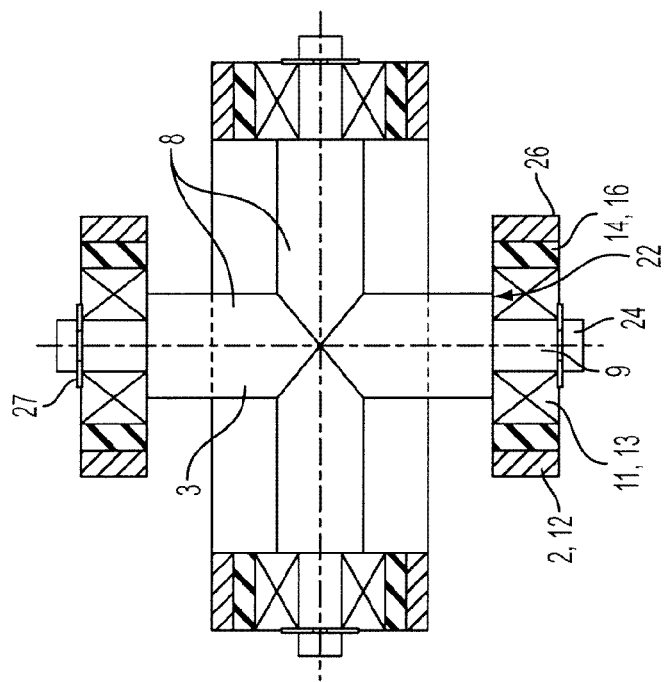
FIG. 4 shows a representation along a section A-A from FIG. 3.

In the exemplary embodiment shown in FIGS. 3 and 4, the insulation element 14 is disposed in a receiving opening respectively between the bearing 11 and the yoke arm 12. Here, the inner circumference of the insulating element 14 envelops the outer circumference of the bearing 11, and the yoke arm 12 envelopes the outer circumference of the insulation element 14. The insulating element 14 abuts the shoulder 22 with its front that points toward the internal space 7, the front opposing this preferably being flush with the outer side 26. The securing element 27 abuts the front of the insulation element 14 pointing towards the outer side 26.

The insulation elements 14 are attached to the respective bearings 11 by adhesive connection, positive fit or force fit. For example, the adhesive connection is achieved by vulcanization or gluing, the positive fit is achieved by abutting to shoulders in the joint yoke 2 or in their yoke arms 12 or by securing rings in the joint yokes 2 or in their yoke arms 12, and the force fit is achieved by press fit of the insulation elements 14 in the joint yokes 2 or in their yoke arms 12. In the FIGS. 1 to 4, for example, the force fit or the adhesive connection between the bearings 11 and the insulation elements 14 is shown.

The bearings 11 are designed as single-row bearings, for example, as anti-friction bearing, e.g., as needle or ball bearings, the bearings 11 may of course also be designed as plain bearings.

The bearings 11 are fixed in a suitable manner, radially relative to the axis of the joint, in the joint yokes 2 or their yoke arms 12. Possible embodiments are, for example, press fit, bonding or positive fit (abutting at the shoulder (FIGS. 1 and 2)) or press fit, bonding or positive fit (securing ring or the like) of the outer races of the bearing in the joint yokes 2 or their yoke arms 12 (FIGS. 3 and 4).

In the universal joint according to the FIGS. 1 to 4, an input moment (direction of rotation 28) is transmitted via the driven shaft 4 (drive shaft) onto the associated pin bearer 8 which, being connected with the crossing pin bearer 8, relays the moment to it and thence on to the joint yoke 2 of the shaft 6 to be driven or the drive shaft. This is represented by means of the output moment (direction of rotation 29) that is equidirectional with the input moment (direction of rotation 28). Seen in axial direction of the joint, the insulation element 14 thus permits a large compliance that can be used for isolation while the anisotropic stiffness characteristic of the insulation element 14 provides a large torsional stiffness of the universal joint 1. In addition, a particularly effective uncoupling with regard to acoustics and/or vibration dynamics of the shafts 4 or 6 that are connected with each other is achieved. In the embodiment shown, the drive shaft 4 is represented on the right side in the plane of the drawing. Of course, the drive shaft 4 may also be disposed on the left side in the plane of the drawing. Naturally, the directions of rotation 28 or 29 may also be opposite to the direction of rotation shown.

The universal joint 1 shown in the FIGS. 1 to 4 is particularly suitable for use in the steering column of a motor vehicle. The shafts 4 and 6 are shown oriented in alignment towards each other. In the vehicle, there usually is an angled position, relative to each other, with the universal joint maintaining the transmission of the rotation. The angled position is shown in FIGS. 1 and 3 by means of the angle of inclination 31.

The foregoing embodiments are for the purpose of elucidating the present invention and are not to be interpreted as limiting the present invention. The invention can of course be altered and improved without departing from the gist thereof and includes equivalents.

What is claimed is:

1. A universal joint for coupling a drive shaft and a driven shaft, the universal joint comprising:
    a first joint yoke having axially opposite yoke arms with bearing bores configured to receive bearings having pin bores;
    a second joint yoke having axially opposite yoke arms with bearing bores configured to receive bearings having pin bores;
    a cross member comprising orthogonally-arranged pin bearers having pins configured to be inserted into the pin bores; and
    at least one insulation element configured to be inserted between at least one pin and a respective pin bore, the insulation element having an elliptical bore that forms crescent-shaped recesses between the pin and an inner wall of the insulation element.

2. A universal joint according to claim 1, wherein the insulation element is formed as a bush.

3. A universal joint according to claim 1, wherein the insulation element has anisotropic properties.

4. A universal joint for coupling a drive shaft and a driven shaft, the universal joint comprising:
    a first joint yoke having axially opposite yoke arms with bearing bores configured to receive bearings;
    a second joint yoke having axially opposite yoke arms with bearing bores configured to receive bearings;
    a cross member comprising orthogonally-arranged pin bearers having pins configured to be inserted into the bearings; and
    at least one insulation element configured to be inserted between at least one bearing bore and a respective bearing, the at least one insulation element having an elliptical bore that forms crescent-shaped recesses between the bearing and an inner wall of the insulation element.

5. A universal joint according to claim 4, wherein the insulation element is formed as a bush.

6. A universal joint according to claim 4, wherein the insulation element has anisotropic properties.

* * * * *